United States Patent [19]

von Musil

[11] 4,173,724

[45] Nov. 6, 1979

[54] TWO PART LAMINATED STATOR FOR AN ELECTRIC MACHINE WITH AN AIR-GAP WINDING

[75] Inventor: Rudolf von Musil, Berlin, Fed. Rep. of Germany

[73] Assignee: Siemens Aktiengesellschaft, Berlin and Munich, Fed. Rep. of Germany

[21] Appl. No.: 857,700

[22] Filed: Dec. 5, 1977

[30] Foreign Application Priority Data

Dec. 10, 1976 [DE] Fed. Rep. of Germany ....... 2656132

[51] Int. Cl.² .............................................. H02K 1/12
[52] U.S. Cl. ..................................... 310/258; 310/42; 310/51; 310/216
[58] Field of Search ................ 310/254, 51, 256, 258, 310/259, 216, 217, 42

[56] References Cited

U.S. PATENT DOCUMENTS

| | | | |
|---|---|---|---|
| 1,688,891 | 10/1928 | Spreen | 310/258 |
| 1,978,100 | 10/1934 | Buerke | 310/258 |
| 2,323,114 | 6/1943 | Bradford et al. | 310/42 X |
| 2,607,816 | 8/1952 | Ryder et al. | 310/42 |
| 2,723,359 | 11/1955 | Feiertag | 310/42 X |
| 3,082,337 | 3/1963 | Horsley | 310/258 X |
| 3,405,297 | 10/1968 | Madsen | 310/258 |
| 3,708,707 | 1/1973 | Kranz | 310/258 |
| 3,792,299 | 2/1974 | Hallerbäck | 310/258 |
| 3,876,893 | 4/1975 | Ross | 310/258 |

FOREIGN PATENT DOCUMENTS

2210851 12/1973 France.
528168 10/1972 Switzerland.

*Primary Examiner*—Mark O. Budd
*Attorney, Agent, or Firm*—Herbert L. Lerner

[57] ABSTRACT

Stator of an electric machine having an air-gap winding with every respective second bar thereof being radially outwardly cranked in the end turn region thereof includes a laminated core subdivided radially into two concentric component laminated cores and defining therebetween a cylindrical joint, at least one of the component laminated cores being formed with axially extending slots at the cylindrical joint for relieving from magnetic tension the inner component core of the two concentric component cores.

2 Claims, 3 Drawing Figures

TWO PART LAMINATED STATOR FOR AN ELECTRIC MACHINE WITH AN AIR-GAP WINDING

The invention relates to a stator of an electric machine having an air-gap winding.

In generators with air-gap windings, such as are disclosed in German Published Non-Prosecuted Application DT-OS No. 1 488 784, the transmission of torque when the radial structural limit of the air-gap winding is simultaneously relatively small presents a special problem. A relatively small radial structural limit can be attained by providing a one-layer winding with a slight lateral spacing of the winding rods, every second rod in the end turn thereof being outwardly cranked in a conventional manner in order to gain adequate space for the end connections.

In order, moreover, to keep the stray fields and the magnetic potential difference for a given effective inductance as small as possible, the laminated core must engage the outer periphery of the air-gap winding as closely or tightly as possible. With such a construction, however, it is difficult to introduce or insert the entire air-gap winding axially into the bore of the stator.

It is accordingly an object of the invention to provide a stator of an electric machine with an air-gap winding wherein this winding is able to be axially inserted into the stator bore while simultaneously being able to control reliably all of the forces that appear.

With the foregoing and other objects in view, there is provided, in accordance with the invention, a stator of an electric machine having an air-gap winding with every respective second bar thereof being radially outwardly cranked in the end turn region thereof comprising a laminated core subdivided radially into two concentric component laminated cores and defining therebetween a cylindrical joint, at least one of the component laminated cores being formed with axially extending slots at the cylindrical joint for relieving from magnetic tension the inner component core of the two concentric component cores.

In accordance with another feature of the invention, also included are elastic isolating members received in oppositely disposed pairs, respectively, of the axially extending slots formed in both of the component laminated cores at the cylindrical joint and mutually connecting the component laminated cores.

In accordance with a further feature of the invention, the inner component core has a radial thickness that is at least as great as the radial offset of the end cranking of the respective winding bar.

Other features which are considered as characteristic for the invention are set forth in the appended claims.

Although the invention is illustrated and described herein as embodied in stator of an electric machine with an air-gap winding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figures 1A, 1B:
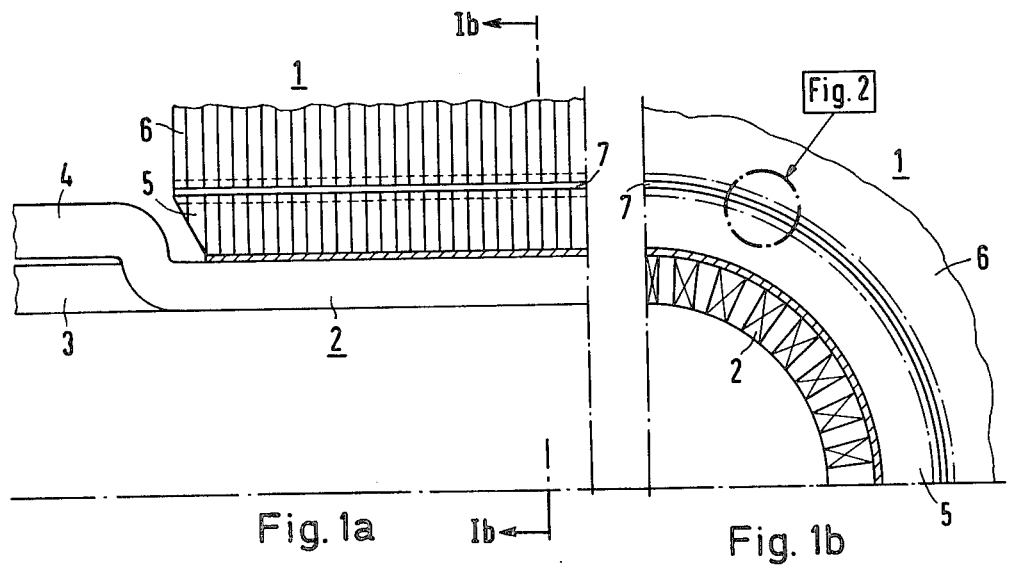
FIG. 1a is a fragmentary longitudinal sectional view diagrammatically showing a stator of an electric machine having an airgap winding.
FIG. 1b is a cross-sectional view of FIG. 1a taken along the line 1b—1b in direction of the arrows.

Referring now to the drawing and first, particularly, to FIG. 1a thereof, there is shown a stator laminated core 1 having a bore wherein a diagrammatically indicated air-gap winding 2 is disposed which has a bar 3 extending straight outwardly in the end turn or overhang winding region thereof and a bar 4 bent or cranked radially outwardly in order to provide adequate space for the end connections of the winding 2. In order to keep the stray fields and the magnetic potential difference for a given effective inductance as small as possible, the laminated core 1 must be in as close or tight engagement as possible with the air gap winding 2 at the outer periphery thereof. Because of the bent or cranked bars 4, it is then no longer possible to insert the entire air-gap winding 2 axially into the bore formed in the laminated core 1 of the stator. In order to permit this, however, in accordance with the invention, the laminated core 1 is divided radially into two concentric or coaxial rings i.e. into component laminated cores 5 and 6. The radial thickness of the radially inner component laminated core 5 should be at least as great as the radial offset of the end cranking of the winding bar 4. This division thus affords a facilitated assembly of the air-gap winding 2 but, as a consequence thereof, great forces due to the magnetic potential are exerted upon the inner component laminated core 5, which is relatively thin when compared to the outer component laminated core 6. Since the radial forces exerted upon the laminated core 5, 6 are proportional to $\Phi^2/A$ i.e. to the quotient of the magnetic flux and the area penetrated by the flux, it is therefore necessary to reduce the area in the cylindrical joint 7 (note FIG. 1b), that area being determinative for the foregoing relationship $\Phi^2/A$, so that the radially inner component laminated core 5 is largely relieved of the magnetic tension.

Figure 2:
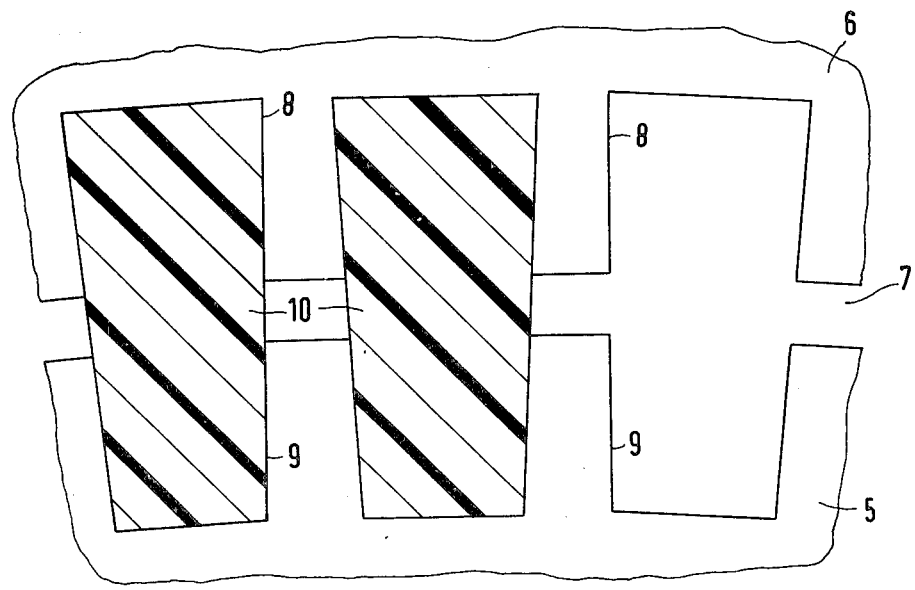
FIG. 2 is a fragmentary, greatly enlarged view of FIG. 1b showing the joint or parting line of the laminated core thereof.

To accomplish this objective, axially extending slots 8 and 9 are incised in one or both of the component laminated cores 5 and 6, as is clearly seen in FIG. 2, especially in the right-hand part thereof. Through suitable dimensioning of the slots 8 and 9, the inner, relatively thin laminated core 5 is virtually entirely relieved of the magnetic tension.

In order to be able to transmit torque well and simultaneously prevent transmission of vibrations from the outer component laminated core 6 to the inner component laminated core 5, elastic isolation members 10 are additionally inserted into the respective pairs of opposing slots 8 and 9, and form a firm though slightly elastic yielding connection between the inner and the outer component laminated cores 5 and 6.

By these measures, it is thus possible, in a relatively simple manner, to dispose a radially flat air-gap winding with cranked end yokes at a slight distance or spacing from the laminated core and nevertheless introduce the winding in its entirety into the bore of the laminated core. The additionally appearing forces, which are involved due to the radial subdivision of the laminated core, can also be reliably controlled and transmitted.

There are claimed:

1. In a stator of an electric machine having a stator winding and a laminated core subdivided into radially inner and radially outer concentric component cores defining a cylindrical joint therebetween, axially extending slots formed in said component laminated cores at said cylindrical joint and coupling means fitted in said slots for preventing rotation of said laminated core components, said stator winding being secured at the inner periphery of said inner component core, said stator winding comprising a one-layer air gap winding with every respective second bar thereof being radially outwardly bent in the end turn region thereof, said coupling means comprising elastic isolating members received in oppositely disposed pairs of said axially extending slots.

2. Stator according to claim 1, wherein the radial thickness of said radially inner component core is at least as great as the radial offset of said radially outward bend of said every respective second winding bar.

* * * * *